(12) United States Patent
Yan et al.

(10) Patent No.: US 11,023,534 B2
(45) Date of Patent: Jun. 1, 2021

(54) CLASSIFICATION METHOD AND A CLASSIFICATION DEVICE FOR SERVICE DATA

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventors: Qiang Yan, Beijing (CN); Xiao Wang, Beijing (CN); Shengli Ge, Beijing (CN); Aihua Li, Beijing (CN)

(73) Assignees: BEIJING JINGDONG SHANGKE INFORMATION TECHNOLOGY CO, LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 217 days.

(21) Appl. No.: 16/310,301

(22) PCT Filed: Apr. 21, 2017

(86) PCT No.: PCT/CN2017/081387
§ 371 (c)(1),
(2) Date: Dec. 14, 2018

(87) PCT Pub. No.: WO2017/215346
PCT Pub. Date: Dec. 21, 2017

(65) Prior Publication Data
US 2019/0197057 A1    Jun. 27, 2019

(30) Foreign Application Priority Data

Jun. 15, 2016  (CN) .......................... 201610423480.1

(51) Int. Cl.
*G06F 16/906* (2019.01)

(52) U.S. Cl.
CPC .................................. *G06F 16/906* (2019.01)

(58) Field of Classification Search
CPC ... G06F 16/906; G06K 9/6222; G06K 9/6284
See application file for complete search history.

(56) References Cited

U.S. PATENT DOCUMENTS

| 6,735,550 B1 | 5/2004 | Weekley et al. |
| 2004/0236742 A1 | 11/2004 | Ogura et al. |
| 2016/0379232 A1* | 12/2016 | Alonso ................... G06Q 10/00 705/7.33 |

FOREIGN PATENT DOCUMENTS

| CN | 103810261 A | 5/2014 |
| CN | 104181597 A | 12/2014 |

(Continued)

OTHER PUBLICATIONS

CN104181597A translation (Espacenet translation of Chinese publication cited by applicant). (Year: 2014).*

(Continued)

*Primary Examiner* — Jay A Morrison
(74) *Attorney, Agent, or Firm* — Oblon, McClelland, Maier & Neustadt, L.L.P.

(57) ABSTRACT

A classification method and a classification device for service data. The classification method includes: acquiring service data, each including plural service indicators; extracting the service data whose category attribute meets a preset condition according to a set extraction rule to form a first data set, the extraction rule set according to part of the service indicators; taking and clustering the service data that are not extracted as a second data set; determining a classification result of the service data according to the first data set and a clustering result of the second data set; extracting service data of definite category attributes according to the extraction rule; and determining a classification result of (Continued)

service data according to a result of clustering of the service data which are not extracted and the service data having definite category attributes.

18 Claims, 3 Drawing Sheets

(56) References Cited

FOREIGN PATENT DOCUMENTS

| | | |
|---|---|---|
| CN | 104699702 A | 6/2015 |
| CN | 106156791 A | 11/2016 |
| EP | 1 455 300 A2 | 9/2004 |

OTHER PUBLICATIONS

International Search Report dated Jul. 31, 2017 in PCT/CN2017/081387 filed Apr. 21, 2017.
Office Action dated Jan. 25, 2021 in corresponding Indian Application No. 201937000285.

* cited by examiner

CLASSIFICATION METHOD AND A CLASSIFICATION DEVICE FOR SERVICE DATA

TECHNICAL FIELD

The present disclosure relates to the field of data processing, in particular to a classification method and a classification device for service data.

BACKGROUND

Data clustering is a conventional technique used in data mining and data classification. However, in the process of classifying service data, service data usually have certain service attributes, while the conventional clustering method simply solves the problem from the data values, ignoring the service meaning of the data. For example, some data with particularly high or particularly low service indicators will be culled as outliers and will no longer participate in clustering, but these culled outliers may be data with higher service value.

Therefore, when being classified according to the conventional clustering method, the data with higher service value can not reflect its unique value, affecting the accuracy of the classification for service data.

SUMMARY

According to one aspect of some embodiments of the present disclosure, there is provided a service data classification method, comprising: performing Extract-Transform-Load process to acquire service data, each of which includes a plurality of features; extracting the service data that are outliers determined according to at least one feature to form a first data set, which includes one or more classes; taking the service data that are not extracted as a second data set, and clustering the service data in the second data set; determining a classification result of the service data according to the classes in the first data set and the classes in a clustering result of the second data set.

In some embodiments, the extracting comprises: extracting the service data, of which a value of a certain feature is an outlier according to a set threshold to form a class in the first data set; or, extracting the service data, of which a logical operation result of values of a plurality of features is an outlier to form a class in the first data set; or, extracting, according to a data distribution of a certain feature, service data of which a value of the certain feature is an outlier, to form a class in the first data set.

In some embodiments, the determining comprises: merging the classes in the first data set with the classes in the second data set having the closest category attributes to the classes in the first data set to obtain the classification result of the service data.

In some embodiments, the merging comprises: determining an average feature value of each class in the first data set and the second data set, and merging the classes in the first data set with the classes in the second data set having the closest category attributes to the classes in the first data set to obtain the classification result of the service data, wherein the average feature value is an average value or a median of the values of the features used for forming the first data set; or, in case that a difference in the number of the service data between the classes in the first data set and the classes in the second data set is out of a preset range, merging the classes in the first data set with the classes in the second data set having the closest category attributes to the classes in the first data set to obtain the classification result of the service data.

In some embodiments, prior to clustering the service data in the second data set, the method further comprises: selecting values of feature that are outliers from the service data in the second data set, and assigning a feature demarcation value used to determine whether the values of feature are outliers to the feature values that are outliers.

In some embodiments, prior to clustering the service data in the second data set, the method further comprises: calculating a mean value of all non-null values of a certain feature of the service data in the second data set, and assigning the mean value to null values of features of the service data in the second data set.

In some embodiments, the clustering comprises: pre-clustering the service data in the second data set according to each predetermined number of clusters, respectively, and calculating a profile coefficient of a pre-clustering result corresponding to each predetermined number of clusters; ranking the corresponding profile coefficients in an ascending order of the predetermined number of clusters, and acquiring several peak values in the profile coefficients and determining a maximum value therefrom; taking the first predetermined number of clusters corresponding to the peak value that meets a preset condition as the actual number of clusters, wherein the preset condition is that a difference between the peak value and the maximum value is less than a preset value; clustering the service data in the second data set according to the actual number of clusters.

According to a second aspect of some embodiments of the present disclosure, there is provided a service data classification device, comprising: a memory; and a processor coupled to the memory, which is configured to execute the classification method for service data for performing operations comprising: performing Extract-Transform-Load process to acquire service data, each of which includes a plurality of features; extracting the service data that are outliers determined according to at least one feature to form a first data set, which includes one or more classes; taking the service data that are not extracted as a second data set, and clustering the service data in the second data set determining a classification result of the service data according to the classes in the first data set and the classes in a clustering result of the second data set.

According to a third aspect of some embodiments of the present disclosure, there is provided a computer non-transitory readable storage medium storing a computer program that, when being executed by a processor, implements the service data classification method for performing operations comprising: performing Extract-Transform-Load process to acquire service data, each of which includes a plurality of features; extracting the service data that are outliers determined according to at least one feature to form a first data set, which includes one or more classes; taking the service data that are not extracted as a second data set, and clustering the service data in the second data set; determining a classification result of the service data according to the classes in the first data set and the classes in a clustering result of the second data set.

Further features of the present disclosure, as well as advantages thereof, will become clearer from the following detailed description of exemplary embodiments of the present disclosure with reference to the accompanying drawings.

In some embodiments, the extracting comprises: extracting the service data, of which a value of a certain feature is an outlier according to a set threshold to form a class in the first data set or, extracting the service data, of which a logical operation result of values of a plurality of features is an outlier to form a class in the first data set; or, extracting, according to a data distribution of a certain feature, service data of which a value of the certain feature is an outlier, to form a class in the first data set.

In some embodiments, the determining comprises: merging the classes in the first data set with the classes in the second data set having the closest category attributes to the classes in the first data set to obtain the classification result of the service data.

In some embodiments, the merging comprises: determining an average feature value of each class in the first data set and the second data set, and merging the classes in the first data set with the classes in the second data set having the closest category attributes to the classes in the first data set to obtain the classification result of the service data, wherein the average feature value is an average value or a median of the values of the features used for forming the first data set; or, in case that a difference in the number of the service data between the classes in the first data set and the classes in the second data set is out of a preset range, merging the classes in the first data set with the classes in the second data set having the closest category attributes to the classes in the first data set to obtain the classification result of the service data.

In some embodiments, the operations further comprising, prior to clustering the service data in the second data set: selecting values of feature that are outliers from the service data in the second data set, and assigning a feature demarcation value used to determine whether the values of feature are outliers to the feature values that are outliers.

In some embodiments, the clustering comprises: pre-clustering the service data in the second data set according to each predetermined number of clusters, respectively, and calculating a profile coefficient of a pre-clustering result corresponding to each predetermined number of clusters; ranking the corresponding profile coefficients in an ascending order of the predetermined number of clusters, and acquiring several peak values in the profile coefficients and determining a maximum value therefrom; taking the first predetermined number of clusters corresponding to the peak value that meets a preset condition as the actual number of clusters, wherein the preset condition is that a difference between the peak value and the maximum value is less than a preset value; clustering the service data in the second data set according to the actual number of clusters.

BRIEF DESCRIPTION OF THE DRAWINGS

In order to explain the embodiments of the present disclosure or the technical solutions in the prior art more clearly, a brief introduction will be given below for the drawings required to be used in the description of the embodiments or the prior art. It is obvious that, the drawings illustrated as follows are merely some of the embodiments of the present utility model. For a person skilled in the art, he or she may also acquire other drawings according to such drawings on the premise that no inventive effort is involved.

DETAILED DESCRIPTION OF THE EMBODIMENTS

Figure 1:
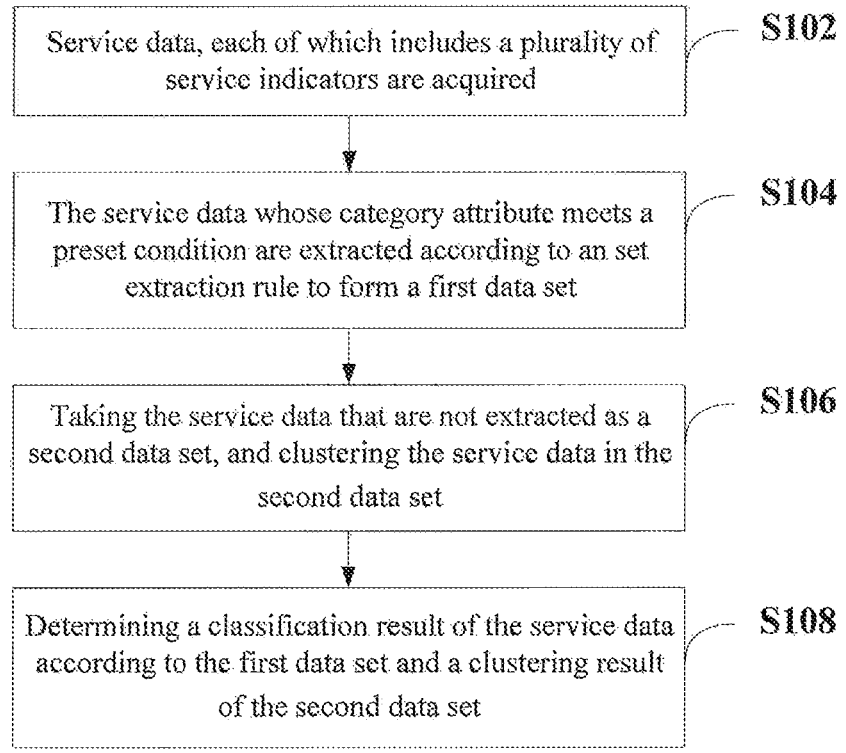
FIG. 1 is a flow chart of some embodiments of a classification method for service data in the present disclosure.

The technical solutions of the embodiments of the present disclosure will be clearly and completely described below with reference to the drawings of the embodiments of the present disclosure. Obviously, the described embodiments are just a part of the embodiments of the present disclosure, instead of all of them. The following description of at least one of the exemplary embodiments is actually merely illustrative, and is not meant to be limitation on the present disclosure and its application or use in any way. All other embodiments obtained by persons of ordinary skill in the art based on the embodiments of the present disclosure without creative efforts shall fall within the protection scope of the present disclosure.

It should be noted that, unless otherwise specified, relative arrangement of components and steps, numerical expressions and numerical values set forth in these embodiments are not limited within the scope of the present disclosure.

Meanwhile, it should be understood that, for the convenience of description, the dimensions of the various parts shown in the drawings are not drawn according to the actual proportional relationship.

Techniques, methods, and devices known to an ordinary person skilled in the relevant art may not be discussed in detail but, where appropriate, such techniques, methods, and devices are to be considered part of the description which has been granted a patent right.

In all the examples shown and discussed here, any specific value should be construed as merely illustrative, not as a limitation. Therefore, other examples in the exemplary embodiments may have different values.

It should be noted that similar signs and letters represent similar items in the following figures. Thus, once an item is defined in a figure, it is not required to be further discussed in subsequent figures.

The conventional clustering method has a problem that a problem is solved simply from the data level, and the service meaning of the data is neglected, such that the unique value of the data with high service value cannot be reflected, thus affecting the accuracy of classification for service data. The present disclosure is proposed to solve this problem.

FIG. 1 is a flow chart of some embodiments of a classification method for service data in the present disclosure. As shown in FIG. 1, the method of the embodiments includes step S102~S108.

In step S102, Extract-Transform-Load process is performed to acquire service data, each of which includes a plurality of features.

In some embodiments, related service indicators can be set according to purposes of service classification, and related service data are acquired. The service data includes a plurality of dimensions or features, each of which corresponds to a service indicators associated with a purpose of service classification.

For example, a certain purpose of service classification is to determine users' ranks according to the users' degrees of activity, that is, to divide the users' degrees of activity. Thus, the service data, for example, may include features that reflect a user's degree of activity, i.e., a number of PV (page view), a total number of orders, a total order amount, a continuous time of PV, a number of collected products and registration time, etc.

Data extraction and feature calculation may be performed by an Extract-Transform-Load technology. For example, the condition of the feature to be obtained can be defined by WHERE condition in the SQL statement, and the result of calculation can be inserted into the target table structure.

Identification information may be selectively added to the feature to identify whether the value of the feature and the service purpose are positively correlated. For example, in a case of classifying users based on degrees of activity, a greater number of PV means that the user's degree of activity is higher, and a larger interval between adjacent login times means that the user's degree of activity is lower. Adding identification information is helpful for the setting and use of features for forming a first data set.

In step S104, the service data that are outliers determined according to at least one feature are extracted to form the first data set, which includes one or more classes.

In the service data, there are service data having definite category attributes. In other words, the service categories of these data can be directly determined according to the values of part of the features of these data. Such data usually have too large or too small values in one or some of the features, and thus are often determined as outliers. For example, for one user, the number of PV is very small, but the total number of orders is very large, and the total order amount is relatively low, which means that the user often makes purchases, but the purchased goods are low-priced daily fast-moving consumer goods; for another user, the number of PV is relatively high, and the continuous time of PV is longer, but the total number of orders is equal to or lower than an average value relative to other users. From the data point of view, both of the above users have a very large or very small value of feature. According to the conventional clustering method, if the service data including the above two users are directly clustered, the clustering effect is poor due to the existence of extreme values; if the clustering is performed after the outliers are removed, although the clustering effect is better, the accuracy of classification for service data is affected since the unique value of the removed data cannot be reflected. Therefore, the present disclosure breaks away from the conventions by extracting part of the service data having specific category attributes to participate in subsequent classification for service data.

In step S106, the service data that are not extracted are taken as a second data set, and the service data in the second data set are clustered.

One implementing manner to form a second data set may be as follows. All the service data are defined to form a data set 0, and the first data set is D, so the second data set may be derived by the following SQL statement:
SELECT *
FROM 0
WHERE NOT EXISTS(SELECT NULL FROM D WHERE O.ID=D.ID)

The clustering method for the second data set may adopt such clustering algorithms as Kmeans, Brich and Optics, etc. By taking the Kmeans algorithm as an example, the clustering process is as follows:

1. Randomly selecting the initial centers of k classes, wherein the value of k is an actual number of clusters;
2. For all data points, calculating the distances from each data point to the k centers, and assign the data points to the class of which the center is at the shortest distance;
3. Updating center points of all classes;
4. Determining whether the set convergence condition (or stop condition) is satisfied. If not, return to steps 2-3 to continue iteration; if it is satisfied, stop iteration, and the cluster centers are the optimal cluster centers, and the clustering result is the final clustering result.

In step S108, a classification result of the service data is determined according to the classes in the first data set and the classes in a clustering result of the second data set.

In case that the first data set includes one class, all the service data in the first data set are taken as a whole and are not further divided. At this time, the service data in the first data set have the same category attribute, for example, they are all service data with high degree of activity or service data with low degree of activity.

When the first data set includes more classes, the service data in the same class have the same category attribute. The classes of the first data set can be formed using different methods. For example, part of the service data may be extracted, respectively, according to different set extraction rules, each of which corresponds to one or more features or a range of feature values to form different classes. The different classes form a first data set.

For instance, the first data set may include class A, class B and class C, which are extracted according to different extraction rules, respectively. Class A includes service data at the top 5% according to a descending order of the number of orders, and class B includes service data at the last 5% according to a descending order of the number of orders, and class C includes data with more than 200 collected items of goods and more than 150 collected numbers of stores. Apparently, the category attributes of classes A and C represent high degree of activity, and the category attribute of the class B represents low degree of activity. Thus, the characteristics of the classes derived according to the respective extraction rules may be retained to perform targeted mergence in subsequent steps. A person skilled in the art should be clear that the extraction rules are not limited to the rules mentioned above. Other extraction rules can be used as needed, which will not be further explained.

In some embodiments, the classes in the second data set and the first data set can be merged according to the degree of similarity between the category attributes of the classes in the second data set and the first data set, and/or the degree of difference between the numbers of service data of the classes in the second data set and the first data set, to determine the classification result of service data. For example, the classes in the first data set are merged with the classes in the second data set having the closest category attributes to the classes in the first data set to obtain the classification result of the service data. Optionally, the classes in the first data set are merged with the classes in the second data set which have the closest category attributes, and the difference in the number of the service data between each classification of service data in the classification result conforms to a preset range. Optionally, if the difference in the number of service data in the classes of the two sets is relatively small, they may not be combined, and the respective classes of the two sets are directly taken as the final classification result of service data.

The above embodiments extract service data which are outliers with definite category attributes according to at least one feature, and determines a classification result of the service data according to the clustering result of the service data which are not extracted and the service data having definite category attributes, thereby improving the accuracy of classification for service data.

In step S104, the service data that are outliers can be extracted by using multiple methods. Three exemplary methods of extraction are introduced as follows.

The first method is to extract the service data, of which a value of a certain feature is an outlier according to a set threshold to form a class in the first data set. An application example of the method may be: extracting service data whose value of feature exceeds a preset upper threshold and/or is lower than a preset lower threshold.

For example, the number of continuous login days is a very intuitive feature that reflects user activity. Therefore, the upper threshold and the lower threshold can be set according to service requirements. When the number of continuous login days of the users is mostly within one month, with reference to this situation and service requirements, users whose number of continuous login days is greater than 90 days can be obviously determined as highly active users.

Therefore, the most intuitive high-value service data can be extracted according to the features most relevant to the service objectives.

The second method is to extract the service data, of which a logical operation result of values of a plurality of features is an outlier to form a class in the first data set. An application example of the method may be: extracting the service data whose logical operation result of values of a plurality of features exceeds a preset upper threshold and/or lower than a preset lower threshold.

Taking the two features of an order amount and a number of orders as an example. Not only they both can represent user activity by themselves, but also the relationship between the order amount and the number of orders can represent user activity. For example, a ratio of the order amount and the number of orders of various service data may be calculated, that is, to calculate an average order unit price of every user. If the average order unit price is very high, such as more than 50,000 yuan, the user may be classified to a highly active class. Namely, whether to extract the service data corresponding to the ratio that is an outlier can be determined based on whether the ratio of the order amount to the number of orders is an outlier in all service data.

The method takes the operational relationship between features into account, so that data can be extracted more flexibly.

The third method is to extract the service data of which a value of a certain feature is an outlier according to a data distribution of the certain feature, to form a class in the first data set.

For example, the mean and the variance of all the values of the same feature can be calculated, and the values of feature outside a preset floating range which takes the mean as the center are determined as outliers, and service data of which the values of feature are outliers are extracted, wherein the preset floating range can be determined according to the preset multiple of the variance. For example, the mean and the variance of all the values of feature representing the number of continuous login days are calculated, and values with the number of continuous login days greater than (mean+2*variance) and less than (mean−2*variance) are extracted.

For instance, it is also possible to rank all the data in the same feature in order, and extract the service data of which the values of feature are on the upper side of the preset upper quantile and/or the lower side of the preset lower quantile. For example, values larger than 95 quantile or less than 5 quantile are extracted, that is, the smallest 5% and the largest 5% of all values of the same feature are extracted.

This method selects features with very large or very small values by using the distribution characteristics of service data, and is applicable to application scenarios where it is difficult to set specific numerical thresholds according to service conditions.

In step S108, for example, the classification result of the service data can be determined by the following method.

The following is an application example of how to select a class in the second data set and a class in the first data set for merging according to features: first of all, determining an average feature value of each class in the first data set and the second data set, wherein the average feature value is an average value or a median of the values of the features used for forming the first data set; then, merging the classes in the first data set with the classes in the second data set having the closest category attributes to the classes in the first data set to obtain the classification result of the service data.

For example, service data of which an order amount is greater than 300,000 yuan can be extracted to form class D in the first data set. Therefore, during merging, the classes in the second data set are ranked in a descending order in terms of the average value or the median of the order amount. The first class in the ranked result is the class that can be merged with class D. The method is also applicable to the mergence of the classes extracted when the features used for forming the first data set are multiple. For example, class E in the first data set is determined by the condition that the division of the value of the order amount by the value of the number of orders is greater than 50,000. Thus, the average feature value of the classes in the second data set is the average value or the median of the calculation result of dividing the order amount by the number of orders of various service data.

By calculating the average feature value of different classes, it is possible to objectively determine a class that is closest to the class to be merged in terms of category attribute, thereby to improve the accuracy of mergence.

To make a difference in the number of the service data between each classification of service data in the classification result conforms to a preset range, the following method of determining whether to perform merging between the classes can be performed: in case that a difference in the number of the service data between the classes in the first data set and the classes in the second data set is out of a preset range, the classes in the first data set are merged with the classes in the second data set having the closest category attributes to the classes in the first data set to obtain the classification result of the service data. Namely, if a difference in the number of the service data between the classes in the first data set and the classes in the second data set does not exceed a preset range, it is unnecessary to perform merging; if it exceeds a preset range, the classes that are closest in category attributes are merged.

Whether to perform the above condition of the mergence operation is not only applicable between the classes in the first data set and the classes in the second data set, but can also be used between the classes of the first data set itself. Namely, if the number of classes in the first data set is far less than the number of classes in the second set, the classes in the first data set having the same category attribute can be merged to make the data of the result uniform.

By determining whether to perform merging according to the difference in the number of data between different classes, the classification result of service data can be more uniform and more applicable.

The present disclosure also provides a clustering method for the service data in the second data set.

Figure 2:
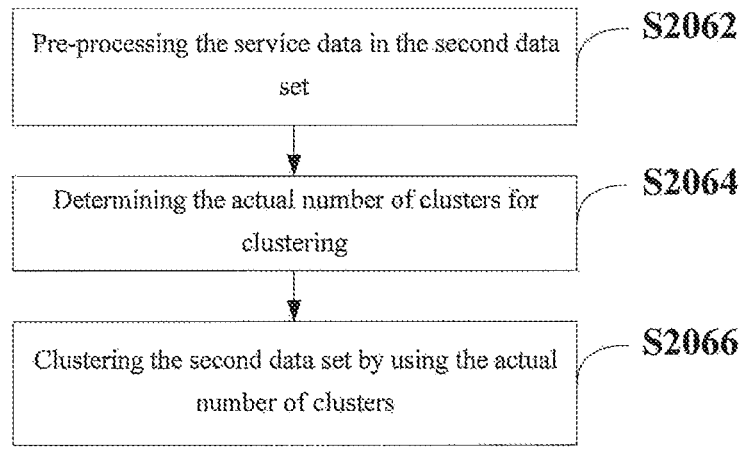
FIG. 2 is a flow chart of some embodiments of a clustering method for service data in the present disclosure.

FIG. 2 is a flow chart of some embodiments of a clustering method for service data. As shown in FIG. 2, the method of the embodiments includes step S2062!S2066.

In step S2062, the service data in the second data set are pre-processed.

The pre-processing may include one or more of outlier processing, null processing, or normalization processing.

An application example of outlier processing is as follows: selecting values of feature that are outliers from the service data in the second data set, and assigning a feature demarcation value used to determine whether the values of feature are outliers to the values of feature that are outliers. For example, if a value of feature is greater than a sum of the mean and the variance of all the values of the same feature, the sum can be assigned to the value of feature; and if a value of feature is smaller than a difference of the mean and the variance of all the values of the same feature, the difference can be assigned to the value of feature; and if a value of feature is greater than the upper quantile of all the values in the same feature, the upper quantile can be assigned to the value of feature; and if value of feature is smaller than the lower quantile of all the values in the same feature, the lower quantile can be assigned to the value of feature. Moreover, if a value of feature is greater than a sum of the mean and the variance of all the values in the same feature, the upper quantile can also be assigned to the value of feature, and if a value of feature is smaller than a difference of the mean and the variance of all the values in the same feature, the lower quantile can be assigned to the value of feature.

Since the data having definite service category attribute have been extracted before the service data clustering, the data pre-processed here are data with a relatively uniform values, and the outlier processing thereof will produce a better clustering effect without affecting the accuracy of the classification for the service data.

An application example of the null processing is as follows: calculating a mean value of all non-null values of a certain feature of the service data in the second data set, and assigning the mean value to null values of feature of the service data in the second data set. Therefore, the null values are placed in an average level in the values of the same feature to improve the accuracy of clustering.

For data that have been subjected to the operations of outlier processing and null processing, they can also be standardized or normalized. An application example of the standardization process is that for the same feature, the mean and the variance of all the values in the feature can be first calculated, and then the original value of each of the feature is replaced by (original value-average)/variance, thereby weightings of the features of the service data participating in clustering are uniformed.

A person skilled in the art may also use other methods of data pre-processing, which will not be further explained.

In step S2064, the actual number of clusters for clustering is determined.

Before clustering, it is possible to manually specify the actual number of clusters according to service needs, or use the following pre-clustering method to determine the actual number of clusters. One application example for determining the number of clusters by the pre-clustering method is as follows.

1. Pre-clustering the service data in the second data set according to each predetermined number of clusters, respectively, and calculating a profile coefficient of a result of a pre-clustering result corresponding to each predetermined number of clusters.

Let the total number of service data participating in the clustering be N. When n is used as the predetermined number of clusters, the profile coefficient of the clustering result is f(n), and the profile coefficient of the $i^{th}$ data point in the clustering result is $S_i$, and the calculation method for the profile coefficient of the clustering result and the data point are shown in formula (1) and formula (2), respectively:

$$f(n) = \Sigma S_i / N \quad (1)$$

$$S_i = (b_i - a_i) / \max(a_i, b_i) \quad (2)$$

where $a_i$ is a mean value of the distance from the $i^{th}$ service data to each service data within a class; $b_i$ is a minimum value of every mean value, of the distance from the $i^{th}$ service data to each service data in the classes not including the $i^{th}$ service data.

2. Ranking the corresponding profile coefficients in an ascending order of the predetermined number of clusters, and acquiring several peak values in the profile coefficients and determine a maximum value therefrom.

The above steps can be presented visually by a coordinate system. For example, the horizontal coordinate represents a predetermined number of clusters and the vertical coordinate represents a profile coefficient. The profile coefficient of which the vertical coordinate is larger than data points of the adjacent two points is a peak value, and the maximum value of the peak values is a peak value of all the data points.

3. Taking the first predetermined number of clusters corresponding to the peak value that meets a preset condition as the actual number of clusters, wherein the preset condition is that a difference between the peak value and the maximum value is less than a preset value.

The profile coefficient is used to measure the degree of cohesion of each class and the degree of separation between different classes in the clustering result. Therefore, the maximum value of the profile coefficient is usually taken as the actual number of clusters. However, for the classification of service, in addition to meeting the requirement that the profile coefficient is large, the number of clusters has to be small, so as to avoid the excessive number of clusters, which is not helpful to the presentation of the classification results for service data. Therefore, the present disclosure selects several peak values greater than a specified threshold, such as a peak value of a value derived by subtracting 0.1 from the maximum value, and then takes the minimum number of clusters corresponding to the several peak values meeting the above condition corresponding to the above conditions as the actual number of clusters.

An application example of determining the actual number of clusters is: first of all, determining whether the first peak value is the maximum value, and if it is, the number of clusters corresponding to the maximum value is taken as the actual number of clusters; if the first peak value is not the maximum value, the first number of clusters corresponding to a peak value of which the difference with the maximum value is smaller than a preset value is taken as the actual number of clusters.

In Step S2066, the second data set is clustered by using the actual number of clusters.

By using the above method, the service data participating the clustering and the clustering method are optimized, which makes the clustering result more accurate, thereby improving the accuracy of classification for service data.

Figure 3:
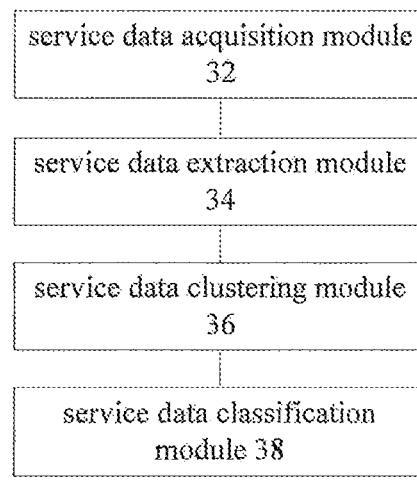
FIG. 3 is a structural diagram of some embodiments of a classification device for service data in the present disclosure.

FIG. 3 is a structural diagram of some embodiments of a classification device for service data in the present disclosure. As illustrated by FIG. 3, the device of this embodiment comprises: a service data acquisition module 32 for performing Extract-Transform-Load process to acquire service data, each of which includes a plurality of features; a service data extraction module 34 for extracting the service data that are outliers determined according to at least one feature to form a first data set, which includes one or more classes; a service data clustering module 36 for taking the service data that are not extracted as a second data set, and clustering the service data in the second data set; a service data classification module 38 for determining a classification result of the service data according to the classes in the first data set and the classes in a clustering result of the second data set.

The above embodiments extract service data which are outliers with definite category attributes according to at least one features, and determines a classification result of the service data according to the clustering result of the service data which are not extracted and the service data having definite category attributes, thereby improving the accuracy of classification for service data.

In some embodiments, the first data set may include one or more classes, and the service data classification module 38 is used for merging the classes in the first data set with the classes in the second data set having the closest category attributes to the classes in the first data set to obtain the classification result of the service data. In this way, the accuracy of the classification result of service data can be improved.

Figure 4:
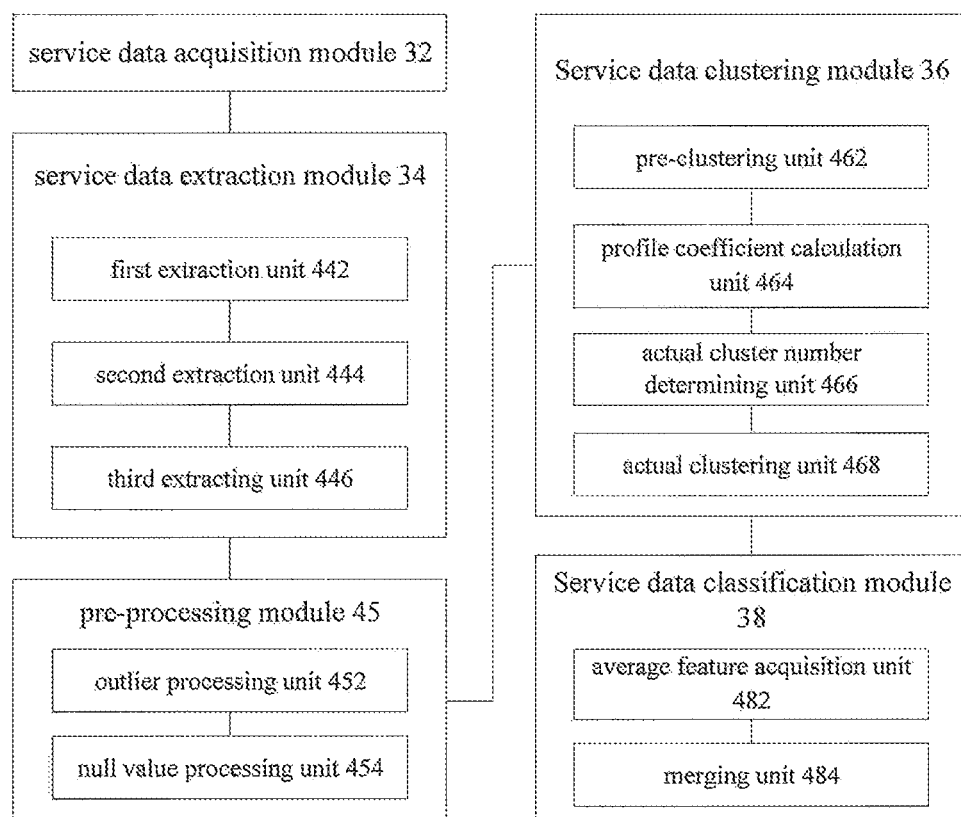
FIG. 4 is a structural diagram of some other embodiments of a classification device for service data in the present disclosure.

FIG. 4 is a structural diagram of some embodiments of a classification device for service data. As illustrated by FIG. 4, the service data extraction module 34 of this embodiment may include at least one of a first extraction unit 442, a second extraction unit 444 and a third extraction unit 446.

In some embodiments, the first extraction unit 442 is configured to extract the service data, of which a value of a certain feature is an outlier according to a set threshold to form a class in the first data set, so that the most intuitive high-value service data can be extracted according to the feature most relevant to the service purpose.

The second extraction unit 444 is configured to extract the service data, of which a logical operation result of values of a plurality of features is an outlier to form a class in the first data set. The second extraction unit 444 takes into account the operational relationship between the features, and may extract data more flexibly, thereby extending the scope of setting the extraction rule.

The third extracting unit 446 is configured to extract, according to a data distribution of a certain feature, service data of which a value of the certain feature is an outlier, to form a class in the first data set, which is applicable to the application scenario that it is difficult to set a specific numerical threshold according to the service condition.

The service data classification module 38 may include an average feature acquisition unit 482 and a merging unit 484. The average feature acquisition unit 482 is configured to determine an average feature value of each class in the first data set and the second data set, wherein the average feature value is an average value or a median of the values of the features used for forming the first data set; the merging unit 484 is configured to merge the classes in the first data set with the classes in the second data set having the closest category attributes to the classes in the first data set to obtain the classification result of the service data. By calculating the average feature value of different classes, it is possible to objectively determine a class that is closest to the class to be merged in terms of category attribute, thereby to improve the accuracy of mergence.

Optionally, the service data classification module 38 may also be configured to in case that a difference in the number of the service data between the classes in the first data set and the classes in the second data set is out of a preset range, merge the classes in the first data set with the classes in the second data set having the closest category attributes to the classes in the first data set to obtain the classification result of the service data. By determining whether to perform merging according to the difference in the data between different classes, the classification result of service data can be more uniform and more applicable.

The classification device may further include a pre-processing module 45 which comprises an outlier processing unit 452 and/or a null value processing unit 454.

The outlier processing unit 452 is configured to select values of feature that are outliers from the service data in the second data set, and assign a feature demarcation value used to determine whether the values of feature are outliers to the feature values that are outliers. Since the data having definite service category attributes have been extracted before the clustering for service data, the data pre-processed here are data with a relatively uniform value, and the outlier processing thereof will produce a better clustering effect without affecting the accuracy of the classification for service data.

The null value processing unit 454 is configured to calculate a mean value of all non-null values of a certain feature of the service data in the second data set, and assign the mean value to null values of feature of the service data in the second data set. Therefore, the data with null values are placed in an average level in the data of the same feature to improve the accuracy of clustering.

Wherein, the service data clustering module 36 may include a pre-clustering unit 462, a profile coefficient calculation unit 464, an actual cluster number determining unit 466 and an actual clustering unit 468. The pre-clustering unit 462 is configured to pre-cluster the service data in the second data set according to each predetermined number of clusters, respectively. The profile coefficient calculation unit 464 is configured to calculate a profile coefficient of a pre-clustering result corresponding to each predetermined number of clusters. The actual cluster number determining unit 466 is configured to rank the corresponding profile coefficients in an ascending order of the predetermined number of clusters, and acquire several peak values in the profile coefficients and determine a maximum value therefrom, and take the first predetermined number of clusters corresponding to the peak value that meets a preset condition as the actual number of clusters, wherein the preset condition is that a difference between the peak value and the maximum value is less than a preset value. The actual clustering unit 468 is configured to cluster the service data in the second data set according to the actual number of clusters.

By adopting the above method, the clustering result can have both good mathematical characteristics and good usability.

Figure 5:
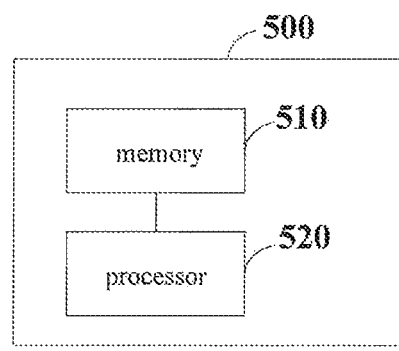
FIG. 5 is a structural diagram of still some other embodiments of a classification device for service data in the present disclosure.

FIG. 5 is a structural diagram of still some other embodiments of a classification device for service data in the present disclosure. As shown in FIG. 5, the device 500 in this embodiment includes: a memory 510 and a processor 520 coupled to the memory 510, wherein the processor 520 is configured to execute the method of service data classification in any of the previous embodiments on a basis of instructions stored in the memory 510.

Wherein, the memory 510 may include, for example, a system memory, a fixed non-volatile storage medium, or the like. The system memory stores, for example, an operating system, an application, a boot loader, and other programs.

Figure 6:
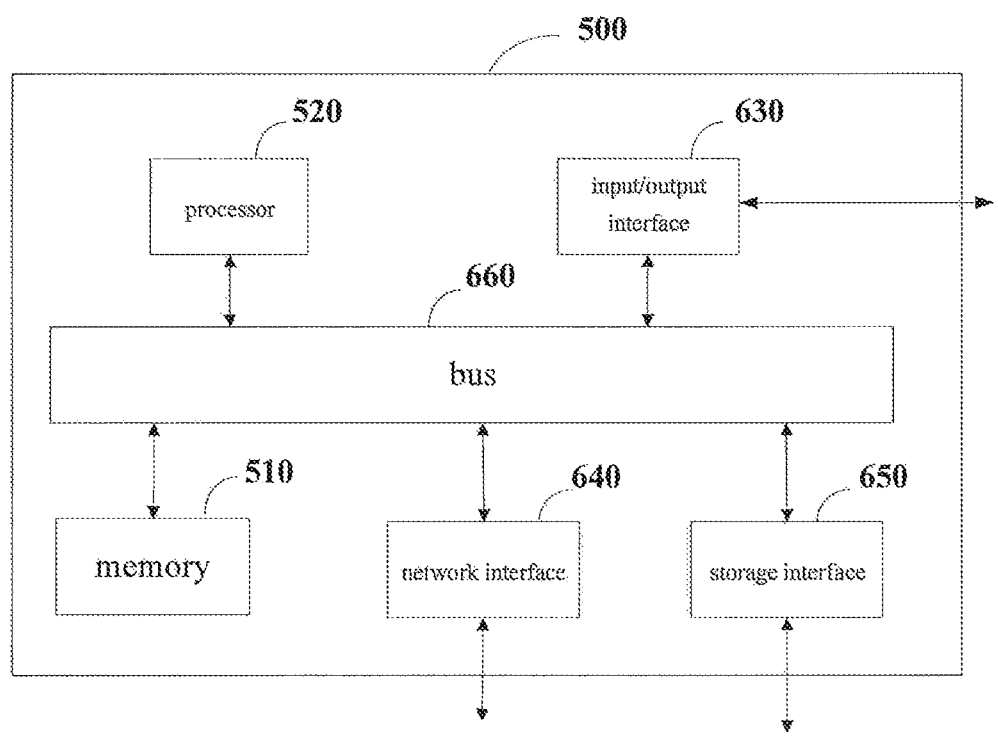
FIG. 6 is a structural diagram of still some other embodiments of a classification device for service data in the present disclosure.

FIG. 6 is a structural diagram of still some other embodiment of a classification device for service data in the present disclosure. As shown in FIG. 6, the device 500 in this embodiment includes: a memory 510 and a processor 520, and may also include an input/output interface 630, a network interface 640, a storage interface 650, etc. The interfaces 630, 640, 650, the memory 510 and the processor 520 may be connected, for example, via a bus 660. Wherein, the input/output interface 630 provides a connection interface for input/output devices such as a display, a mouse, a keyboard, a touchscreen, and the like. The network interface 640 provides a connection interface for various networked devices. The storage interface 650 provides a connection interface for an external storage device such as an SD card or a USB flash disk, etc.

The embodiments of the present disclosure also provide a computer non-transitory readable storage medium on which a computer program is stored, wherein the program, when being executed by the processor, performs any of the preceding service data classification methods.

One skilled in the art should understand that, the embodiments of the present disclosure may be provided as a method, a system, or a computer program product. Therefore, the embodiments of the present disclosure can take the form of an entirely hardware embodiment, an entirely software embodiment or an embodiment containing both hardware and software elements. Moreover, this disclosure can be in a form of one or more computer program products containing the computer-executable codes which can be implemented in the computer-executable non-transitory storage media (including but not limited to disk memory, CD-ROM, optical memory, etc.).

The present disclosure is described with reference to the flow charts and/or block diagrams of the method, device (system) and computer program product according to the embodiments of the present disclosure. It shall be understood that each flow and/or block in the flowcharts and/or block diagrams and a combination of the flows and/or blocks in the flowcharts and/or block diagrams can be implemented by computer program instructions. These computer program instructions can be provided to a general purpose computer, a special purpose computer, an embedded processor, or a processor of other programmable data processing devices so as to generate a machine for generating means for implementing the functions of one or more flows of a flowchart and/or one or more blocks of a block diagram by using the instructions executed by the computer or the processor of other programmable data processing devices.

These computer program instructions can also be stored in a computer readable memory guiding the computer or other programmable data processing devices to work in a particular way, such that the instructions stored in the computer readable memory generate an article of manufacture containing instruction means which implement the functions of one or more flows of a flowchart and/or one or more blocks in a block diagram.

These computer program instructions can also be loaded onto a computer or other programmable data processing devices such that a series of operational steps are performed on a computer or other programmable devices to produce computer-implemented processing, so that the instructions executed on a computer or other programmable devices provide steps for implementing the functions of one or more flows of a flowchart and/or one or more blocks of a block diagram.

The above content is only preferred embodiments of this present disclosure, but cannot be used for limiting this disclosure. Any modification, equivalent replacement and improvement, etc. within the spirit and principle of this disclosure shall be contained in the scope of protection of this disclosure.

What is claimed is:

1. A classification method for service data comprising:
performing an Extract-Transform-Load process to acquire service data and inserting a result of the process into a target table structure, wherein each of the service data includes a plurality of service indicators;
extracting the service data whose category attribute meets a preset condition from the service data according to a set extraction rule to form a first data set, wherein the extraction rule is set according to part of the service indicators;
taking the service data that are not extracted as a second data set and clustering the service data in the second data set, wherein the clustering comprises:
pre-clustering the service data in the second data set according to each predetermined number of clusters, respectively, and calculating a profile coefficient of a pre-clustering result corresponding to each predetermined number of clusters;
ranking corresponding profile coefficients in an ascending order of the predetermined number of clusters and acquiring several peak values in the profile coefficients and determining a maximum value therefrom;
taking the first predetermined number of clusters corresponding to the peak value that meets a preset condition as an actual number of clusters, wherein the preset condition is that a difference between the peak value and the maximum value is less than a preset value; and
clustering the service data in the second data set according to the actual number of clusters; and
determining a classification result of the service data according to the first data set and a clustering result of the second data set.

2. The classification method according to claim 1, wherein the extracting comprises:
extracting the service data of which a certain service indicator data is an outlier according to a set threshold to form the first data set;
or,
extracting, according to a logical operation result of a plurality of service indicators of the service data, the service data, of which the logical operation result is an outlier to form the first data set;
or,
extracting, according to a data distribution of a certain service indicator, service data of which the certain service indicator data is an outlier, to form the first data set.

3. The classification method according to claim 1, wherein the determining comprises:
merging one or more classes in the first data set with one or more classes in the second data set having the closest category attributes to the classes in the first data set to obtain the classification result of the service data.

4. The classification method according to claim 3, wherein the merging comprises:
  determining an average feature value of service indicators involved in the extraction rule in the first data set and the second data set, and merging the classes in the first data set with the classes in the second data set having the closest category attributes to the classes in the first data set to obtain the classification result of the service data, wherein the average feature value is an average value or a median of the service indicators involved in the extraction rule of each class;
  or,
  merging the classes in the first data set with the classes in the second data set having the closest category attributes to the classes in the first data set to obtain the classification result of the service data, and making the difference in the number of the service data between each service data classification in the classification result conforms to a preset range.

5. The classification method according to claim 1, wherein the extracting comprises:
  extracting the service data according to different set extraction rules to form different classes, respectively, to form the first data set.

6. The classification method according to claim 1, further comprising, prior to clustering the service data in the second data set:
  selecting service indictor data that are outliers from the second data set, and assigning a service indicator demarcation value used to determine whether the service indicator data are outliers to the service indicator data that are outliers;
  or,
  calculating a mean value of all non-null data of a certain service indicator of the second data set, and assigning the mean value to null values of the service indicator in the second data set.

7. A classification device for service data comprising:
  a processor; and
  a memory coupled to the processor storing program instructions which, when executed by the processor, cause the processor to:
    perform an Extract-Transform-Load process to acquire service data and insert a result of the process into a target table structure, wherein each of the service data includes a plurality of service indicators;
    extract the service data whose category attribute meets a preset condition from the service data according to a set extraction rule to form a first data set, wherein the extraction rule is set according to part of the service indicators;
    take the service data that are not extracted as a second data set and cluster the service data in the second data set, wherein the clustering comprises:
      pre-clustering the service data in the second data set according to each predetermined number of clusters, respectively, and calculating a profile coefficient of a pre-clustering result corresponding to each predetermined number of clusters;
      ranking corresponding profile coefficients in an ascending order of the predetermined number of clusters and acquiring several peak values in the profile coefficients and determining a maximum value therefrom;
      taking the first predetermined number of clusters corresponding to the peak value that meets a preset condition as an actual number of clusters, wherein the preset condition is that a difference between the peak value and the maximum value is less than a preset value; and
      clustering the service data in the second data set according to the actual number of clusters; and
    determine a classification result of the service data according to the first data set and a clustering result of the second data set.

8. The classification device according to claim 7, wherein the extracting comprises:
  extracting the service data of which a certain service indicator data is an outlier according to a set threshold to form the first data set;
  or,
  extracting, according to a logical operation result of a plurality of service indicators of the service data, the service data, of which the logical operation result is an outlier to form the first data set;
  or,
  extracting, according to a data distribution of a certain service indicator, service data of which the certain service indicator data is an outlier, to form the first data set.

9. The classification device according to claim 7, wherein the determining comprises:
  merging one or more classes in the first data set with one or more classes in the second data set having the closest category attributes to the classes in the first data set to obtain the classification result of the service data.

10. The classification device according to claim 9, wherein the merging comprises:
  determining an average feature value of service indicators involved in the extraction rule in the first data set and the second data set, and merging the classes in the first data set with the classes in the second data set having the closest category attributes to the classes in the first data set to obtain the classification result of the service data, wherein the average feature value is an average value or a median of the service indicators involved in the extraction rule of each class;
  or,
  merging the classes in the first data set with the classes in the second data set having the closest category attributes to the classes in the first data set to obtain the classification result of the service data, and making the difference in the number of the service data between each service data classification in the classification result conforms to a preset range.

11. The classification device according to claim 7, wherein the extracting comprises:
  extracting the service data according to different set extraction rules to form different classes, respectively, to form the first data set.

12. The classification device according to claim 7, wherein the memory further stores instructions which, when executed by a processor, cause the processor to:
  select service indictor data that are outliers from the second data set, and assigning a service indicator demarcation value used to determine whether the service indicator data are outliers to the service indicator data that are outliers prior to the clustering the service data in the second data set;
  or,
  calculate a mean value of all non-null data of a certain service indicator of the second data set, and assigning the mean value to null values of the service indicator in the second data set prior to the clustering the service data in the second data set.

13. A computer non-transitory readable storage medium storing computer program instructions, which when executed by a processor, cause the processor to:
perform an Extract-Transform-Load process to acquire service data and insert a result of the process into a target table structure, wherein each of the service data includes a plurality of service indicators;
extract the service data whose category attribute meets a preset condition from the service data according to a set extraction rule to form a first data set, wherein the extraction rule is set according to part of the service indicators;
take the service data that are not extracted as a second data set and cluster the service data in the second data set, wherein the clustering comprises:
pre-clustering the service data in the second data set according to each predetermined number of clusters, respectively, and calculating a profile coefficient of a pre-clustering result corresponding to each predetermined number of clusters;
ranking corresponding profile coefficients in an ascending order of the predetermined number of clusters and acquiring several peak values in the profile coefficients and determining a maximum value therefrom;
taking the first predetermined number of clusters corresponding to the peak value that meets a preset condition as an actual number of clusters, wherein the preset condition is that a difference between the peak value and the maximum value is less than a preset value; and
clustering the service data in the second data set according to the actual number of clusters; and
determine a classification result of the service data according to the first data set and a clustering result of the second data set.

14. The storage medium according to claim 13, wherein the extracting comprises:
extracting the service data of which a certain service indicator data is an outlier according to a set threshold to form the first data set;
or,
extracting, according to a logical operation result of a plurality of service indicators of the service data, the service data, of which the logical operation result is an outlier to form the first data set;
or,
extracting, according to a data distribution of a certain service indicator, service data of which the certain service indicator data is an outlier, to form the first data set.

15. The storage medium according to claim 13, wherein the determining comprises:
merging one or more classes in the first data set with one or more classes in the second data set having the closest category attributes to the classes in the first data set to obtain the classification result of the service data.

16. The storage medium according to claim 15, wherein the merging comprises:
determining an average feature value of service indicators involved in the extraction rule in the first data set and the second data set, and merging the classes in the first data set with the classes in the second data set having the closest category attributes to the classes in the first data set to obtain the classification result of the service data, wherein the average feature value is an average value or a median of the service indicators involved in the extraction rule of each class;
or,
merging the classes in the first data set with the classes in the second data set having the closest category attributes to the classes in the first data set to obtain the classification result of the service data, and making the difference in the number of the service data between each service data classification in the classification result conforms to a preset range.

17. The storage medium according to claim 13, wherein the extracting comprises:
extracting the service data according to different set extraction rules to form different classes, respectively, to form the first data set.

18. The storage medium according to claim 13, wherein the computer non-transitory readable storage medium further stores computer program instructions which, when executed by the processor, cause the processor to:
select service indictor data that are outliers from the second data set, and assigning a service indicator demarcation value used to determine whether the service indicator data are outliers to the service indicator data that are outliers prior to the clustering the service data in the second data set;
or,
calculate a mean value of all non-null data of a certain service indicator of the second data set, and assigning the mean value to null values of the service indicator in the second data set prior to the clustering the service data in the second data set.

* * * * *